(12) United States Patent
Ershag

(10) Patent No.: US 6,271,427 B1
(45) Date of Patent: Aug. 7, 2001

(54) METHOD FOR RECOVERY OF CARBON AND COMBINATIONS OF HYDROCARBONS FROM POLYMERS, PREFERABLY IN THE FORM OF DISPOSED TIRES, BY PYROLYSIS IN A PYROLYSIS REACTOR

(76) Inventor: Bengt-Sture Ershag, Hogsbole 63, SE-944 91 Hortlax (SE)

( * ) Notice: Subject to any disclaimer, the term of this patent is extended or adjusted under 35 U.S.C. 154(b) by 0 days.

(21) Appl. No.: 09/423,649
(22) PCT Filed: Aug. 20, 1999
(86) PCT No.: PCT/SE99/01418
§ 371 Date: Nov. 19, 1999
§ 102(e) Date: Nov. 19, 1999
(87) PCT Pub. No.: WO00/11110
PCT Pub. Date: Mar. 2, 2000

(30) Foreign Application Priority Data

Aug. 21, 1998 (SE) .................................................. 9802792

(51) Int. Cl.⁷ .............................. C10G 1/00; C10B 21/18
(52) U.S. Cl. ................................ 585/241; 201/2.5; 201/25
(58) Field of Search ............................ 585/241; 201/2.5, 201/25

(56) References Cited

U.S. PATENT DOCUMENTS

| | | | |
|---|---|---|---|
| 4,199,432 | * 4/1980 | Tamm et al. ........................... | 208/8 R |
| 4,297,201 | * 10/1981 | Jones et al. .......................... | 208/11 R |
| 5,821,396 | * 10/1998 | Bouziane .............................. | 585/241 |
| 6,005,149 | * 12/1999 | Bishop .................................. | 585/241 |

* cited by examiner

Primary Examiner—Bekir L. Yildirim
(74) Attorney, Agent, or Firm—Bacon & Thomas

(57) ABSTRACT

The invention relates to a method for the recovery of carbon and combinations of hydrocarbons from discarded tyres or similar polymeric material by pyrolysis, using a reactor (3) in which the material is placed in a preferably largely fragmented condition, whereby the material is heated to pyrolysis temperature by the recirculation of previously formed and heated pyrolysis gas which is led through the material and where the pyrolysis gas obtained in this way is brought to condense to condensable products in a condenser (8) connected to the reactor. In order to improve the possibilities of control of the process of pyrolysis, a reactor is used with an inlet (6) and an outlet (7) so that a gas can be led through the reactor (3) passing over the polymeric material which is placed in it, whereby at least a part of the pyrolysis gas which does not condense in the condenser (8) is heated to a predetermined temperature and is led by recirculation in a circuit through the reactor for heating the polymeric material placed in it.

12 Claims, 1 Drawing Sheet

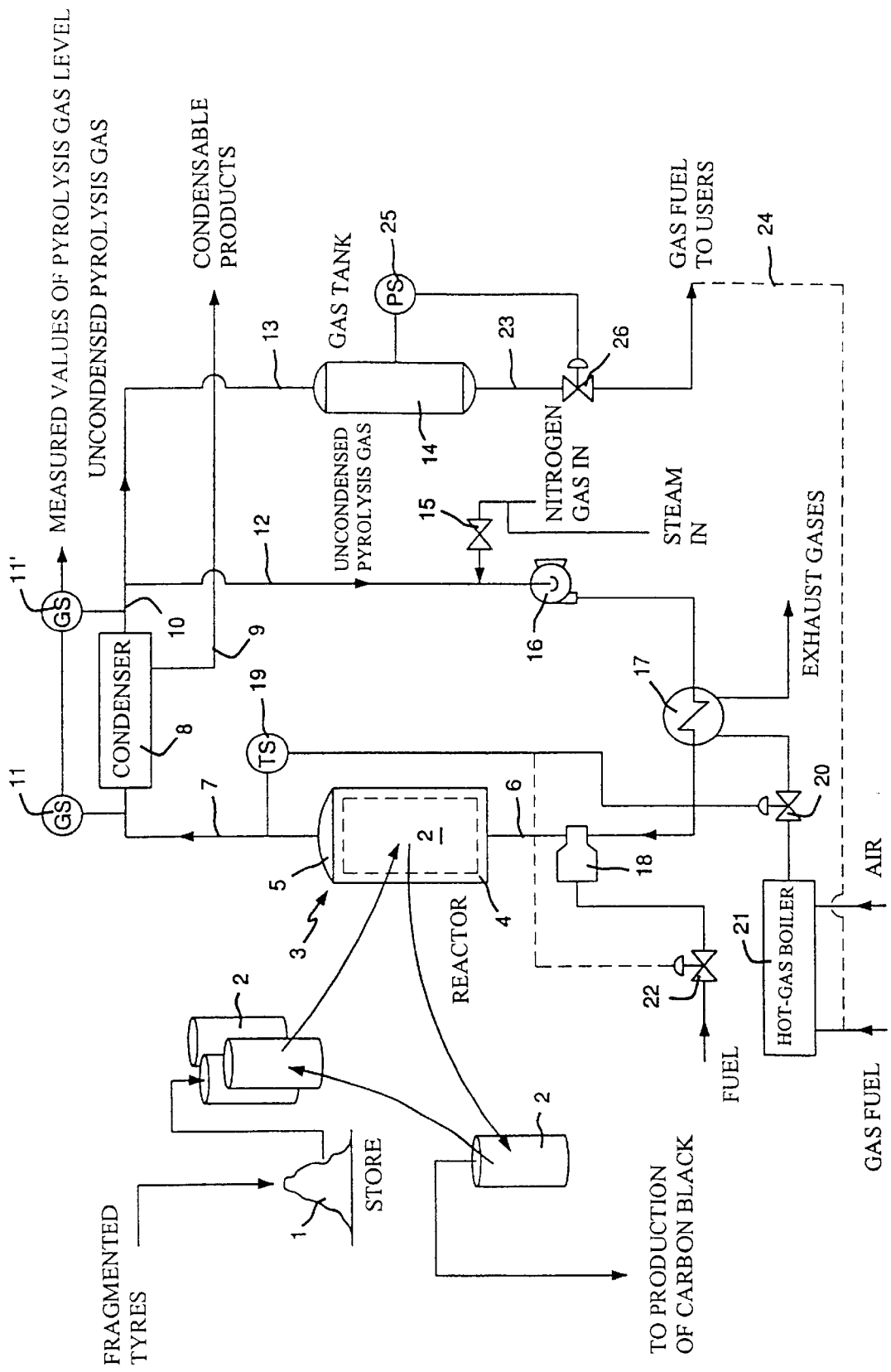
FIGURE

METHOD FOR RECOVERY OF CARBON AND COMBINATIONS OF HYDROCARBONS FROM POLYMERS, PREFERABLY IN THE FORM OF DISPOSED TIRES, BY PYROLYSIS IN A PYROLYSIS REACTOR

The present invention relates to a method for recovery of carbon and combinations of hydrocarbons from polymers, preferably in the form of disposed tyres, by pyrolysis in a pyrolysis reactor.

Disposed vehicle tyres and other rubber materials have in recent times become a major environmental problem partly because such material is in itself not simply biodegradable and thus currently requires extremely large stores and dumping areas, and partly because combustion of the material to ash in special combustion plants forms environmentally dangerous substances such as sulphur-containing acids and other gases which smell of fuel.

Since the material of which the tyre is composed itself contains a large fraction of substances which are valuable for the petrochemical industry, it has proved interesting to find efficient methods for recovering these valuable substances. Tyres consist of, among other things, approximately 35% carbon black as reinforcement in the walls and wearable surface of the tyre, approximately 60% styrene-butadiene-rubber (SBR) and considerable amounts of oil, together with cord in the form of steel wire and/or glass fibre polyester. All of these substances are valuable and expensive to produce by conventional methods from current raw materials. On the other hand, unfortunately, the substances which are elements of the tyre material and which give the tyre its desirable properties are also primarily those substances that make the possibilities of efficiently recycling the tyre more difficult.

Recycling of discarded tyres is known through so-called pyrolysis, in which tyres or rubber waste after fragmentation into pieces of a suitable size are introduced into a large oven-like reactor for gasification in the absence of oxygen, which occurs at temperatures between 450 and 600° C. The pyrolysis process yields a volatile gas, known as pyrolysis gas, which in addition to water vapour also contains carbon monoxide, carbon dioxide, paraffins, olefins and some other hydrocarbons, and from which pyrolysis gas oil and gas can be recovered. Carbon black and/or active carbon can be produced from the solid carboncontaining residue that remains in the reactor after pyrolysis is completed. The product yield from recycled tyres consists mainly of 20% oil, 25% gas, approximately 15% steel and other materials, together with approximately 40% carbon.

One reason that the pyrolysis process up until now has only been used to a very small extent for the recycling of tyres and other rubber material is that the plant in itself requires a major investment, and the prices of the products which can be obtained from discarded tyres at such plants are far too low when compared with the price of equivalent products manufactured by conventional methods. This is particularly true of the various types of petroleum products that can be manufactured by the pyrolysis process and subsequent steps of separation and refinement.

The carbon or the pyrolysis coke which is obtained as a residue of the pyrolysis process has proved itself to be easily comparable, from the point of view of costs, with carbon produced by conventional methods, particularly if the carbon which has been obtained by pyrolysis is further refined to carbon black. This refinement usually occurs through micronisation in several steps after each other and which contain, among other processes, grinding and density separation. Large quantities of carbon black are used as a pigment and filler in the rubber and plastics industries, and the price when produced by the method described above can easily compete with carbon black produced by the conventional method.

By condensing out the less volatile components of the pyrolysis gas which is obtained from the pyrolysis process, so-called pyrolysis oil can be obtained, which essentially resembles diesel or light fuel oil, with the difference that it has a relatively high content of sulphur and aromatic hydrocarbons. The high content of sulphur and of other impurities can be reduced by, for example, filtering, and the hydrocarbon compounds separated into different fractions by condensation. The temperatures at which oil condenses out from the pyrolysis gas differs depending on the density of the oil, but in principle the heavier oil fractions condense out at temperatures around 350° C., the medium heavy oils at temperatures between 100 and 350° C. and the light oils at temperatures under 100° C. The oil fractions which have condensed out are led away for further storage in special collection tanks, while the remaining, non-condensed pyrolysis gas can be advantageously used as fuel for the recycling plant.

As mentioned above, certain products of pyrolysis are so valuable that they can be regarded as raw materials for further processing and refinement. However, experiments have shown that the properties of the said pyrolysis products are to a large extent already determined during the pyrolysis process by such factors as the temperature, rate of heating, holding time in the reactor and rate of cooling. Thus it is desirable to be able to control these parameters very carefully during the pyrolysis process.

If the coke that remains after the pyrolysis process is to be used as solid fuel, it is separated by sieving from steel and glass fibre residues and is taken to storage. On the other hand, coke destined for further refinement to form, for example, carbon black or active carbon must go through another step of pyrolysis treatment which includes, among other things, raising the temperature to between 800 and 900° C. in order to totally remove from the coke any traces of volatile hydrocarbons which may be present, followed by reduction of the temperature and possibly steam treatment.

According to known techniques for the recovery of carbon black and hydrocarbons from discarded tyres by pyrolysis, reactors are used which are heated indirectly, normally by leading molten salt through channels or coils which are arranged to run around the reactor. The disadvantage of the indirect heating technique is, among other things, that the response time for momentarily determined parameters becomes far too slow in order to achieve satisfactory control of the breakdown process of the tyre material in the reactor, nor is there any possibility during the final phase of the reaction to rapidly heat or cool the residue which has been treated by pyrolysis or to add steam to it. In addition, the amount of energy which is needed to heat up and break down the tyre material is normally higher than that which would be required for the equivalent process using a direct method of heating, due to power losses which occur.

In order to achieve direct heating of the tyre waste, and in this way better steer and control the pyrolysis process, it has proved to be suitable to recirculate the pyrolysis gas which forms, by which the said gas after heating is led through the waste and then condensed out to fluid fractions by passing through a condenser.

From U.S. Pat. No. 3,962,045 a plant for the pyrolysis treatment of waste in the form of, among other things, plastic and rubber is known, which uses recycling heated pyrolysis gas for heating of the said waste, in which the circulating pyrolysis gas is lead through a reactor zone in which it is made to cross a continuous stream of waste passing through the reactor zone. After passing the reactor zone, part of the pyrolysis gas formed is led back to a condenser unit for condensation to a fluid phase, while another part of the pyrolysis gas is deflected to a heat exchanger to be reheated and led back into the said reactor zone. The coke that is formed in the pyrolysis process is fed by means of a feed screw out from the lower part of the reactor to a collection unit. Since the waste is continuously fed through the reactor zone, however, the possibilities of controlling the pyrolysis process are limited and the coke which is formed must, from a stored condition, pass through further steps of handling and pyrolysis treatment, that is, heating up to a temperature of between 800 and 900° C., in the case where coke is to be further refined to produce carbon black or active carbon. In addition, the rate of production of condensed products is low, since only part of the pyrolysis gas formed is led through the said condenser unit.

The first aim of the present invention is therefore to achieve a method which improves the opportunities for controlling the process of pyrolysis and which makes it possible to recycle significant components such as carbon black and condensed oils from discarded tyres in a more efficient way and with a higher quality. To be more precise, what is aimed at is a method which makes it possible to control the pyrolysis process based on a schedule which is predetermined, using parameters set depending on the raw material which is used and on which final product is desired, and the method according to the invention is based in principle on the introduction of tyre material for batchwise treatment in the reactor, that recycled pyrolysis gas is used for heating the reactor by being led through it, and that the composition and relative amount of the pyrolysis gas which is produced by the reactor is measured, whereby the information obtained is used to control and regulate the process.

A second aim of the invention is to make the handling of the batchwise processed tyre waste easier, and in this way make it possible to rapidly and simply exchange the material which is to be treated in the reactor.

The main aim of the invention is achieved by it having the special properties that are specified in claim 1.

BRIEF DESCRIPTION OF THE DRAWING

The invention is described more closely below with reference to the attached diagram, which shows schematically the process steps during the execution of the method according to the invention.

DETAILED DESCRIPTION OF THE PREFERRED EMBODIMENT

Reference number 1 is used to denote a store of discarded tyres which in earlier steps, not shown in the diagram, have been cut into strips of width approximately 15 cm by means of a suitably designed knife device, and which in a number of following steps are cut into segments with an average edge length of approximately 5 cm. The design of the knife arrangement will not be described in more detail here since such are already well known in this field of technology. This cutting step, however, does not separate the reinforcing material of the carcass of the tyre from the other rubber material of the tyre, and the complete tyre thus forms the said segments. Since the term segment is rather used to denote a single cut piece, the above-mentioned segments in their entirety will be referred to in the following as fragments, since in the cut condition they can most closely be considered to be a bulk material.

The cut-up tyre fragments are cleaned from loose dirt and dust, which is necessary, among other reasons, to ensure that the pyrolysis coke which will be formed later has as low a content of ash as possible. The washing water should have a temperature of about 40° C. and it is suitable to warm it indirectly using excess heat from the pyrolysis plant. Another reason for the washing is to remove ice and snow from the tyre material, which might lead to the formation of steam and in this way an uncontrolled increase of pressure in the pyrolysis chamber. In order to further ensure that moisture does not enter the pyrolysis chamber, the tyre fragments are dried after washing, a process which is suitably carried out by the said fragments being led through a drying chamber with rotating drying air having a temperature of around 120° C., after which the tyre fragments are transported to the said store.

According to a preferred embodiment of the invention, containers 2 are used. These are filled with tyre fragments from the store and are designed for handling by means of a suitable lifting device, such as a traverse or crane. Reference FIG. 3 refers generally to the pyrolysis chamber or reactor, which includes an outer casing delineating a container space 4 corresponding to the outer surface of the container, and which has a sealable opening 5 at the top which allows containers 2 to be lowered and taken up into the said space for exchange. The reactor 3 and the containers 2 are preferably manufactured of stainless steel that resists high temperatures or a similar material, in order to resist the high temperatures that exist in the reactor. An inlet 6 and an outlet 7 are also attached to reactor 3 so that an inactive gas can pass through it and in this way also pass through the tyre fragments in container 2 which is placed in it. In order to make it possible for the gas to pass through the container when one such is placed in the reactor 3, the container 2 is open at the top and the bottom is provided with openings or perforations, not shown in the figure, the size of which is chosen in relationship to the size of the tyre fragments so that the latter cannot pass through the openings while the gas can pass through the container without significant resistance. Container 2 is further fitted with means which allow it to be connected in an airtight manner to the inlet 6 and outlet 7 of the reactor 3, or is designed in some other way which forces the gas to pass through the container 2 and in this way over the tyre fragments placed in it.

Reactor 3 is connected via outlet 7 in a manner which allows gas transmission to condenser 8, which has a first outlet 9 for the removal of liquid-phase products which have condensed out from the pyrolysis gas which has been formed, and a second outlet 10 for the removal of vapour-phase non-condensed pyrolysis gas which is primarily composed of methane gas, hydrogen gas and certain mixed gases. Condenser 8 will not be further described here since the technology of such is well known, but the said condenser contains a heat exchanger which operates by indirect transfer of heat by means of air, water or another suitable media, in a manner which is well known. A sensor device by which the different components of the pyrolysis gas and their relative amounts in the gas can be analysed is arranged connected to condenser 8. It is suitable that this measurement occurs by means of a first gas chromatograph 11 which is connected to the inlet 7 of the condenser in order to register the composition of the pyrolysis gas on exit from the reactor 3, and a second gas chromatograph 11' connected to the outlet 10 of the condenser in order to register the composition of the pyrolysis gas after the condenser As is evident from the figure, the outlet 10 from the condenser branches into a first pipe 12 and a second pipe 13, where the first pipe forms part of the recycling circuit the purpose of which is to return a part of the uncondensed pyrolysis gas to the inlet 6 of the reactor, while the second pipe 13 forms part of the collection unit which includes a gas tank 14 whose function is to store the remaining part of the uncondensed pyrolysis gas, that is, that part of the pyrolysis gas which cannot for the moment be used in the pyrolysis process. The first pipe 12 in the recirculation circuit, as seen in the direction of flow of the gas, is connected to inlet 15 to lead in inactive gas to the circuit together with a further medium, for example steam, a circulation pump 16, a heat exchanger 17 and a direct burner device 18 which is suitably powered by oil or gas. The temperature of the volatile gases which come from the reactor 3 via the outlet 7 during the pyrolysis process is measured by means of a temperature sensing means 19 and on the basis of this information, the amount of fuel which is fed to a hot-gas boiler 21 for heating of the heat exchanger 17 is controlled and regulated via valve device 20. As is evident from the sketch, a valve device 22 is connected to the temperature sensing means 19 in the outlet 7 from the reactor, in the same way, for the control and regulation of fuel supply to the direct burner device 18.

Gas tank 14 is connected a pipe 23, the function of which is either to lead the excess pyrolysis gas which is in the gas tank to some external user or to recirculate this gas as fuel for the pyrolysis plant. It is suitable to recirculate the excess gas by using it as gas fuel for the hot-gas boiler 21 whose function is to heat the heat exchanger 17, which in the figure is indicated by a dashed line 24. The pressure in the gas tank 14 is sensed by means of a pressure sensing means 25, and the amount of gas fuel which can be sent at any moment to the hot-gas boiler 21 is controlled and regulated via valve device 26.

The pyrolysis plant described above functions in the manner described as follows:

After the placing of one container 2 with tyre fragments into the reactor 3, the reactor, or to be more precise, the tyre fragments which are in the container, are directly heated by the inactive gas being led into the circuit via the inlet 15. The primary task of this inactive gas is to displace any air which may remain after the exchange of the said container 2 and to function as recirculation gas until such time as pyrolysis gas has started to form, after which it gradually will be diluted with pyrolysis gas. It is suitable to use nitrogen gas as heat-carrying gas, or any other gas suitable for the purpose that does not contain oxygen. The nitrogen gas is heated up by the heat exchanger 17 to a temperature of approximately 500–600° C., or to a temperature which is suitable for the initiation of the thermal breakdown process of the tyre fragments. It should be understood that the temperature specified above is only to be regarded as a guideline, because the temperature of the gas which is led through the reactor 3 is determined partly by parameters related purely to construction parameters, such as the efficiency of the reactor, heat losses, etc., and partly by the specific properties of the rubber material, since the temperature at which thermal breakdown of the tyre material occurs varies to a large extent depending on this. For most rubber materials, however, thermal breakdown occurs at a temperature of around 450–600° C. in the reaction chamber, but commences at temperatures as low as approximately 150° C.

The volatile gases containing hydrocarbons—the so-called pyrolysis gas—which emerges from the reactor is led through pipe 7 to the condenser unit 8 from which non-condensable oil products emerge through pipe 9, while a part of the non-condensable pyrolysis gas is led via the branch pipe 12 through the heat exchanger 17 and is recycled to the reactor 3, at which the remaining part of the gas which cannot at that moment be used in the pyrolysis process is led to the gas tank 14 by the branch pipe 13.

The gas chromatographs 11, 11' connected respectively to the inlet and outlet of the condenser 8 register the composition and the amount of vaporised hydrocarbons which at any moment are in the pyrolysis gas, by which information is obtained which is used both to control the process, and to determine exactly when the thermal breakdown of the tyre material is completed, since reactor 3 in this condition completely ceases to produce pyrolysis gas.

Once the pyrolysis process is completed, a solid residue containing carbon, so-called coke, remains in container 2 that is placed in the reactor 3. This coke can be used, once it has been separated from steel and glass fibre remnants by sieving, as the basic material for the production of fuel, generator gas or as a raw material for other purposes. On the other hand, if it is intended to use the coke to produce carbon black and/or active carbon, any traces of volatile hydrocarbons which may be present should be removed from the coke in order to ensure that the carbon black has the required quality, a process which normally occurs by a subsequent pyrolysis treatment at a temperature of between 800 and 900° C. According to the principles of the invention, the advantage is achieved that the coke does not need to be removed from the reactor 3 in order to carry out the required reaction step at the higher temperature. This is achieved quite simply in that the direct burner device 18 is activated, whereby the temperature of the pyrolysis gas which is circulating through the reactor 3 can be rapidly raised to the temperature specified above and the said temperature can be maintained for a predetermined period, or alternatively as long as the chromatographs 11, 11' register that volatile hydrocarbons are emerging from the reactor 3. The circuit of circulating gas through the reactor 3 gives the advantage that the process can be controlled by introducing various types of external media into the circuit. In this part, the process can be rapidly stopped by introducing nitrogen gas into the circuit via inlet 15 so that the reactor 3 is cooled. It is also worth considering the introduction of certain other media such as water vapour into the coke that is formed in the reactor 3.

Once the subsequent process steps have been carried out, reactor 3 is opened so that container 2 can be lifted up from the container space of the reactor, in the manner as illustrated in the figure. Following known techniques, the remaining coke is cleaned from reinforcement material and similar by sieving and then micronised by grinding, to be used, for example, for the production of carbon black.

The current invention is not limited to that described above and shown in the figure, but can be changed and modified in a number of ways within the scope of the concept of the invention as stated in the following claims.

What is claimed is:

1. A method for the recovery of carbon and combinations of hydrocarbons from discarded tires or similar polymeric material by pyrolysis treatment in a reactor (3) whereby the material is heated to pyrolysis temperature in the reactor and the pyrolysis gas obtained is withdrawn from the reactor and brought to condense in a condenser (8) connected to the reactor, characterized by the use of a reactor (3) having an outwardly sealable space in which material is loaded batchwise, an inlet (6) and an outlet (7) forming part of a recirculation circuit wherein a preheated gas is led through the reactor and the condenser passing through and in direct contact with the polymeric material placed in said reactor, wherein at least a part of the pryolysis gas obtained and withdrawn from the reactor which does not condense in the condenser (8) is heated to a predetermined temperature and by recirculation in said recirculation circuit, is led through the reactor for heating of the polymeric material in the reactor.

2. A method according to claim 1, characterized in introducing and circulating a preheated inactive gas in the recirculation circuit at the starting phase of the process in order to heat the material loaded in the reactor.

3. A method according to claim 1, characterized in introducing and circulating a relatively cold inactive gas in the recirculation circuit at the final phase of the pyrolysis process in order to achieve a rapid cooling of the reactor (3).

4. A method according to claim 1, characterized in measuring the relative amount and the composition of the pyrolysis gas emerging from the reactor (3) and using the information obtained for controlling and regulating the pyrolysis process.

5. A method according to claim 4, characterized in that chromatographs (11, 11') are used to determine the pyrolysis gas emerging from the reactor (3).

6. A method according to claim 4, characterized in that the composition of the pyrolysis gas emerging from the reactor (3) are measured at at least two points including both the outlet (7) form the reactor and the outlet (10) from the condenser (8).

7. A method according to claim 1 in order to produce carbon black and/or active carbon, characterized in raising the temperature in the reactor rapidly by means of a direct burner device (18) arranged in connection to the inlet (6) of the reactor (3).

8. A method according to claim 1, characterized by the use of a reactor (3) having a sealable space and in which a container (2) filled with fragmented tire material is placed and that the gas which is lead through the reactor passes through the tire material placed in the container (2).

9. A method according to claim 8, characterized by the use of a container (2) which is open at the top and where the bottom has openings or perforations, the size of which is chosen in relation to the size of the tire fragments so that these cannot pass through the openings, but that the gas can pass through the container without significant resistance.

10. A method according to claim 1, wherein the material to be treated is added in a largely fragmented condition.

11. A method according to claim 1, wherein the material to be treated is heated to a temperature of from 450 to 600° C.

12. A method according to claim 1, wherein the material to be treated is heated to a temperature of from 800 to 900° C.

* * * * *